United States Patent [19]

Hermelin

[11] 4,210,282

[45] Jul. 1, 1980

[54] METHOD OF WATERING

[76] Inventor: Lars G. Hermelin, Mariebergs säteri, 640 20 Björkvik, Sweden

[21] Appl. No.: 881,939

[22] Filed: Feb. 28, 1978

[30] Foreign Application Priority Data

Mar. 3, 1977 [SE] Sweden ................................ 7702416

[51] Int. Cl.$^2$ ............................ B05B 1/08; B05B 3/18
[52] U.S. Cl. .......................................... 239/11; 239/99; 239/191
[58] Field of Search ............................ 239/97, 99–101, 239/11, 190, 191, 1

[56] References Cited

U.S. PATENT DOCUMENTS

| Re. 20,826 | 8/1938 | Kind et al. | 239/99 |
| 1,998,592 | 4/1935 | Schenk | 239/99 |
| 3,818,928 | 6/1974 | Carsten | 239/99 X |

Primary Examiner—Robert W. Saifer

Attorney, Agent, or Firm—Sughrue, Rothwell, Mion, Zinn and Macpeak

[57] ABSTRACT

In a method of watering use is made of a watering apparatus comprising a pressure vessel and a spray device and to which water is supplied through a hose. The pressure vessel discharges intermittently the water supplied thereto, and the watering apparatus is caused to move along a given path while utilizing the energy stored in the water. The number of drive pulses per unit of time to a drive means associated with the watering apparatus is preferably determined by the number of pulses delivered per unit of time from the pressure vessel. The drive pulses may be supplied to the drive means simultaneously as the pressure vessel is supplied with water after delivering a pulse, to increase the pressure in said vessel. The watering apparatus is caused to move reciprocatingly along a path having two ends, the direction of drive being switched at the ends of the path.

5 Claims, 4 Drawing Figures

METHOD OF WATERING

The present invention relates to a method of watering, using a watering apparatus comprising a pressure vessel and a spray device, to which apparatus water is fed through a hose.

Watering apparatus known hitherto, utilising a large-size spray nozzle to obtain a wide spraying area and also to obtain a high-capacity apparatus, are supplied with water through hoses of large dimensions. Such watering apparatus, which incur high costs, can only be moved backwards and forwards along the stretch to be watered with great difficulty. Consequently, such watering apparatus are normally moved from one watering site to another by means of a tractor or like vehicle once or twice per calender day, this measure being economically justified when compared with alternative systems, those as such systems in which the apparatus follows a supply line and is connected automatically thereto, or in which the apparatus involved is of a large size and the spray nozzle is caused to rotate continuously.

It will be seen that all the known systems are encumbered with serious disadvantages, since they either do not operate automatically or, as is the case with apparatus using rotating nozzles, spray water in a circular field.

An object of the present invention is to avoid the disadvantages inherent with the known systems, primarily by providing a watering method and watering apparatus by which a large area can be uniformly watered in an efficient manner without supervision. A further object is to provide a watering method and a watering apparatus of the given type in which the size of the supply hose used, the nozzle opening of the spray device and the watered area are adapted relative to one another in a manner such that the highest possible watering efficiency is obtained at the lowest possible total cost, i.e. both the costs of the watering system and the cost of operating the same.

In its widest aspect, a method according to the invention which fulfils these objects is characterised mainly by the fact that the pressure vessle discharges the water supplied thereto through the hose intermittently, and that the watering apparatus is caused to move along a predetermined path whilst utilising the energy stored in the water.

In this way there can be used a relatively small hose whilst still utilising those advantages afforded by a large-sized spray nozzle. Since the energy of the water is used to drive the watering apparatus, the apparatus can be operated automatically without supervision at low driving costs.

When applying the method according to the invention it is preferred that the number of drive pulses per unit of time transmitted to a drive means associated with the watering apparatus is determined by the number of emission pulses per unit of time from the pressure vessel. In this way synchronisation between the amount of water discharged by the spray and the distance moved by the apparatus can be readily obtained, i.e. it can be ensured while using simple means that the whole of the area is watered uniformly.

In practice, the drive pulses are suitably controlled in a manner such that a drive pulse is passed to the drive means at the same time as the pressure vessel is supplied with water, subsequent to emitting a pulse, to increase the pressure in the vessel.

The drive and control means can be of simple design if the watering apparatus is caused to move reciprocatingly along a path having two ends, switching of the drive direction taking place at the ends of the path. When changing the drive direction, it is convenient to arrange that the direction of the spray device is changed 180°, which can also be effected with simple means.

In order to control the apparatus in a satisfactory manner, the apparatus may be arranged to move along a wire, water being supplied to the apparatus through the hose from a water hydrant arranged in the neighborhood of the center of the path.

The invention also relates to a watering apparatus for carrying out the aforementioned method, the essential characterising features of the apparatus being disclosed in the accompanying claims.

An embodiment of the invention will now be described in more detail with reference to the accompanying drawings.

Figure 3:
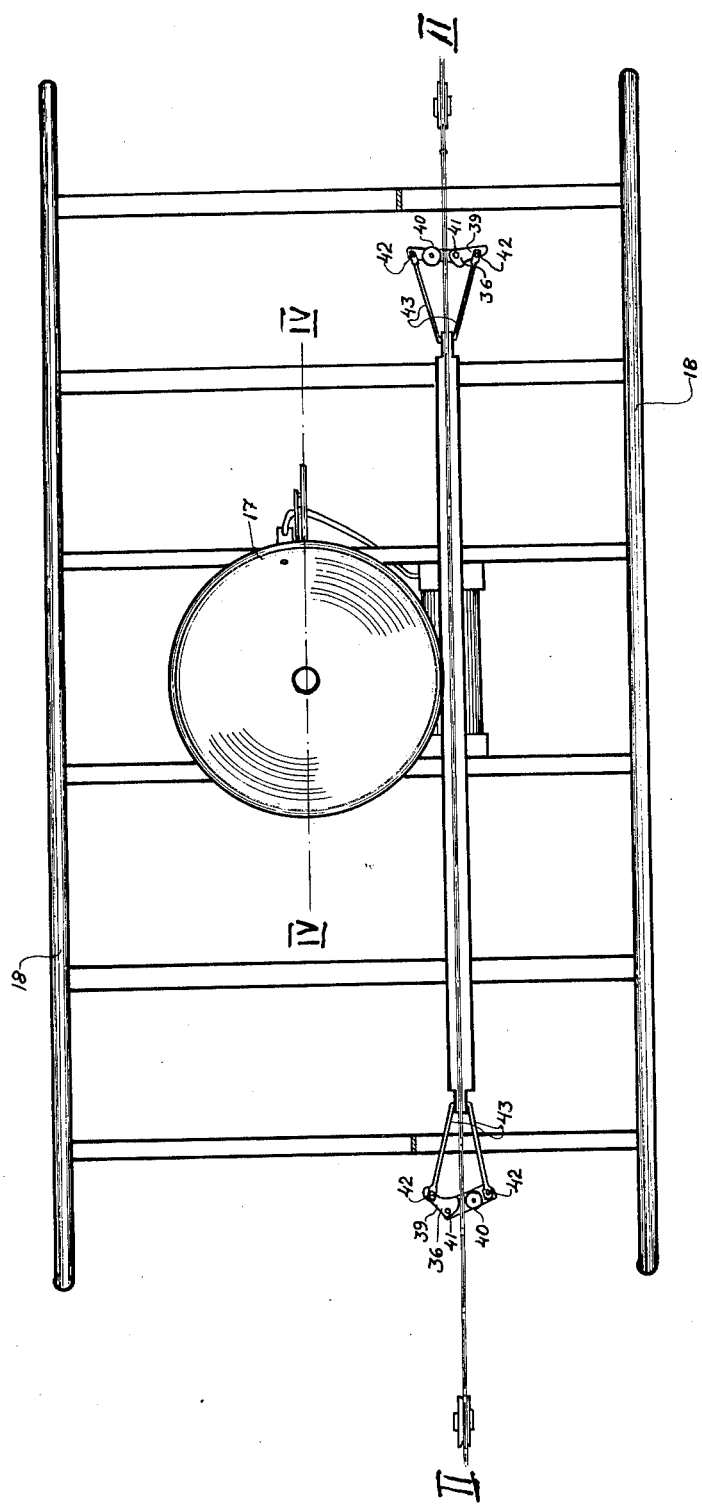
FIG. 3 is a horizontal sectional view taken on the line III—III of FIG. 2.
Figure 4:
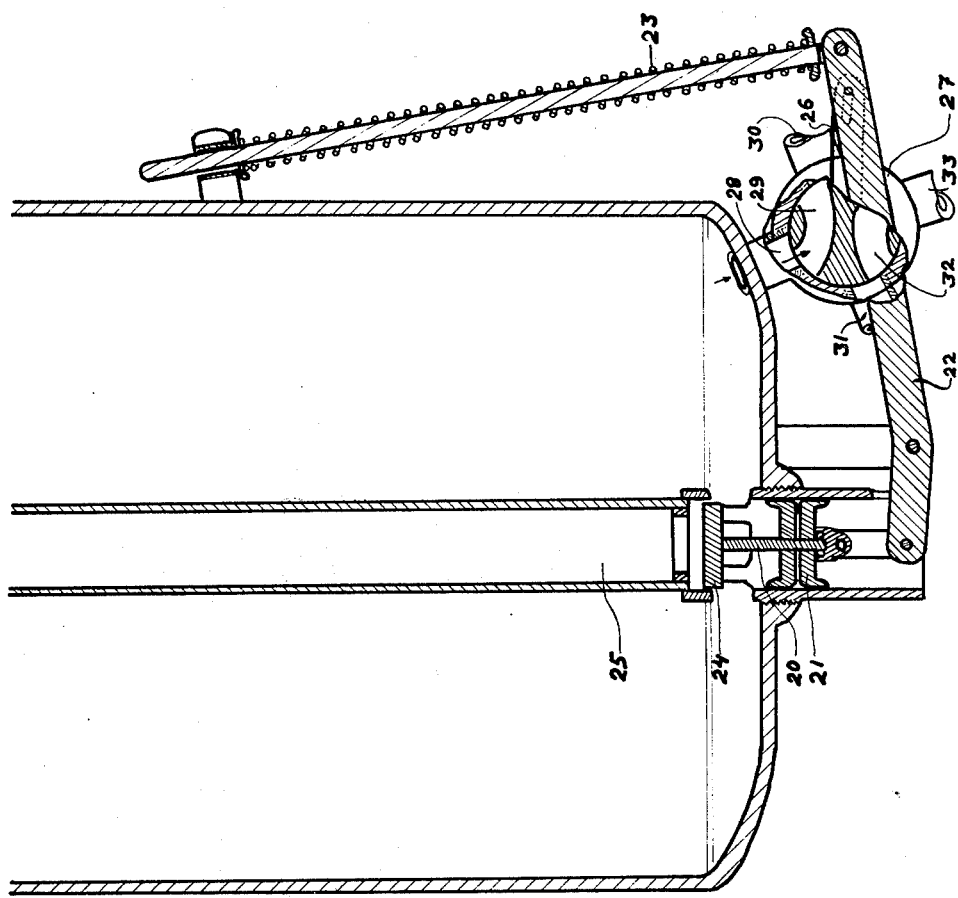

FIG. 4, which is a sectional view on the line IV—IV of FIG. 3, illustrates some elements of the valve mechanism of the pressure vessel.

Figure 1:
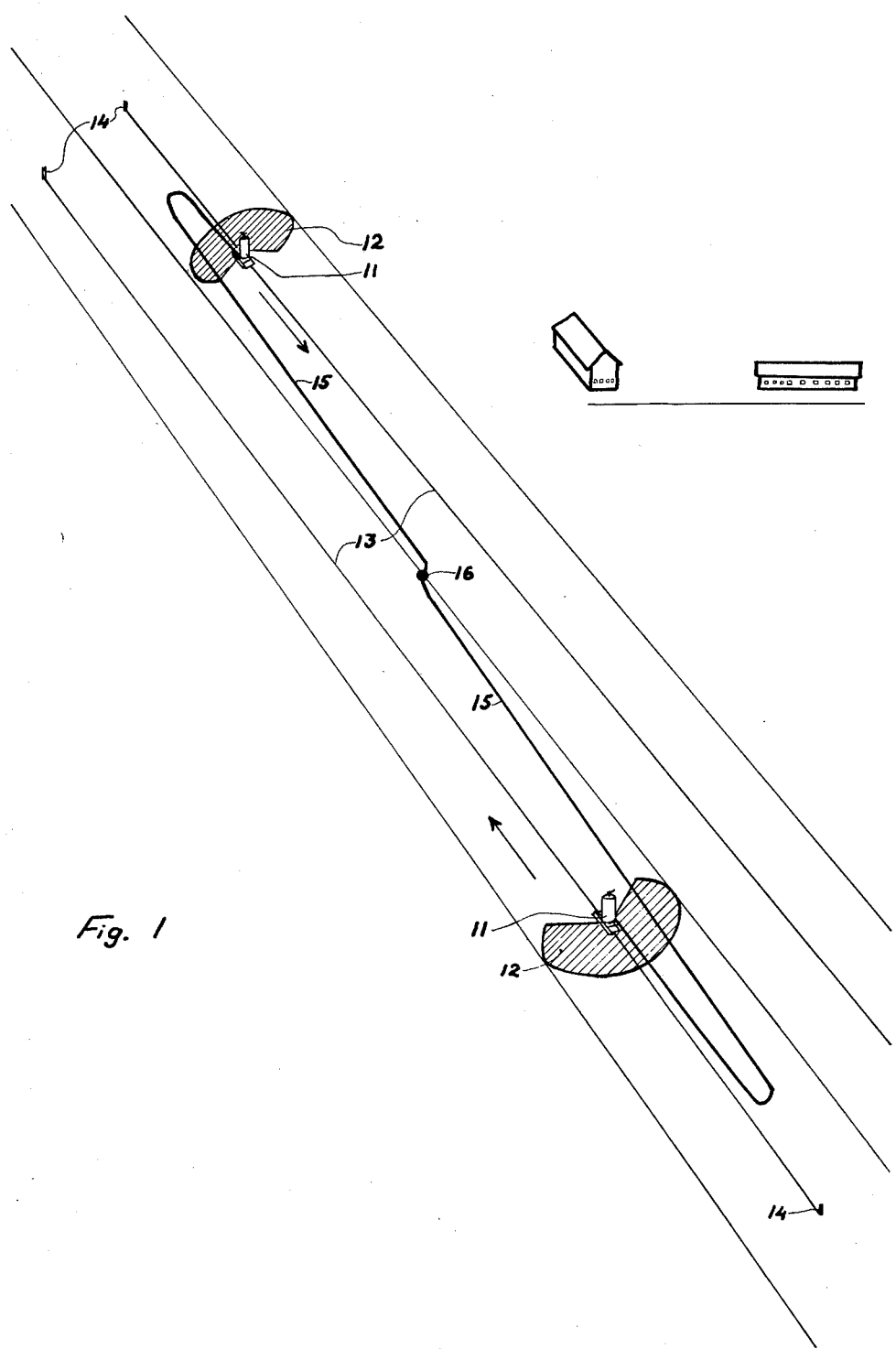
FIG. 1 is a principle diagram showing schematically an area to be continuously watered by means of two watering apparatus according to the invention.

In FIG. 1 there is illustrated schematically two spray devices 11 in operation. Each of the spray devices waters a circle-sector shaped area 12 whilst moving at the same time along a respective wire 13. Each of the wires is attached to two posts 14. Water is fed to the apparatus through hoses 15 from a hydrant 16 arranged generally centrally of the posts and being common to both apparatus. When the apparatus reach a respective end post 14, the direction in which the apparatus is moving is automatically reversed at the same time as the water spray is rotated through 180°. The water is thus sprayed in a circle sector rearwardly relative to the movement direction of the apparatus. In this way problems and damage in conjunction with the driving can be avoided.

If an apparatus 11 moves between its two posts 14 for 48 hours and the spray devices of the apparatus deliver 8 mm of water at each spray moment, the watered surface will be a rectangle which at the end points thereof receives 16 mm of water each fourth day whilst the centre area receives 8 mm of water each other day. A half-circle sector at each of the short sides of the watered area also obtains a varying amount of water.

Figure 2:
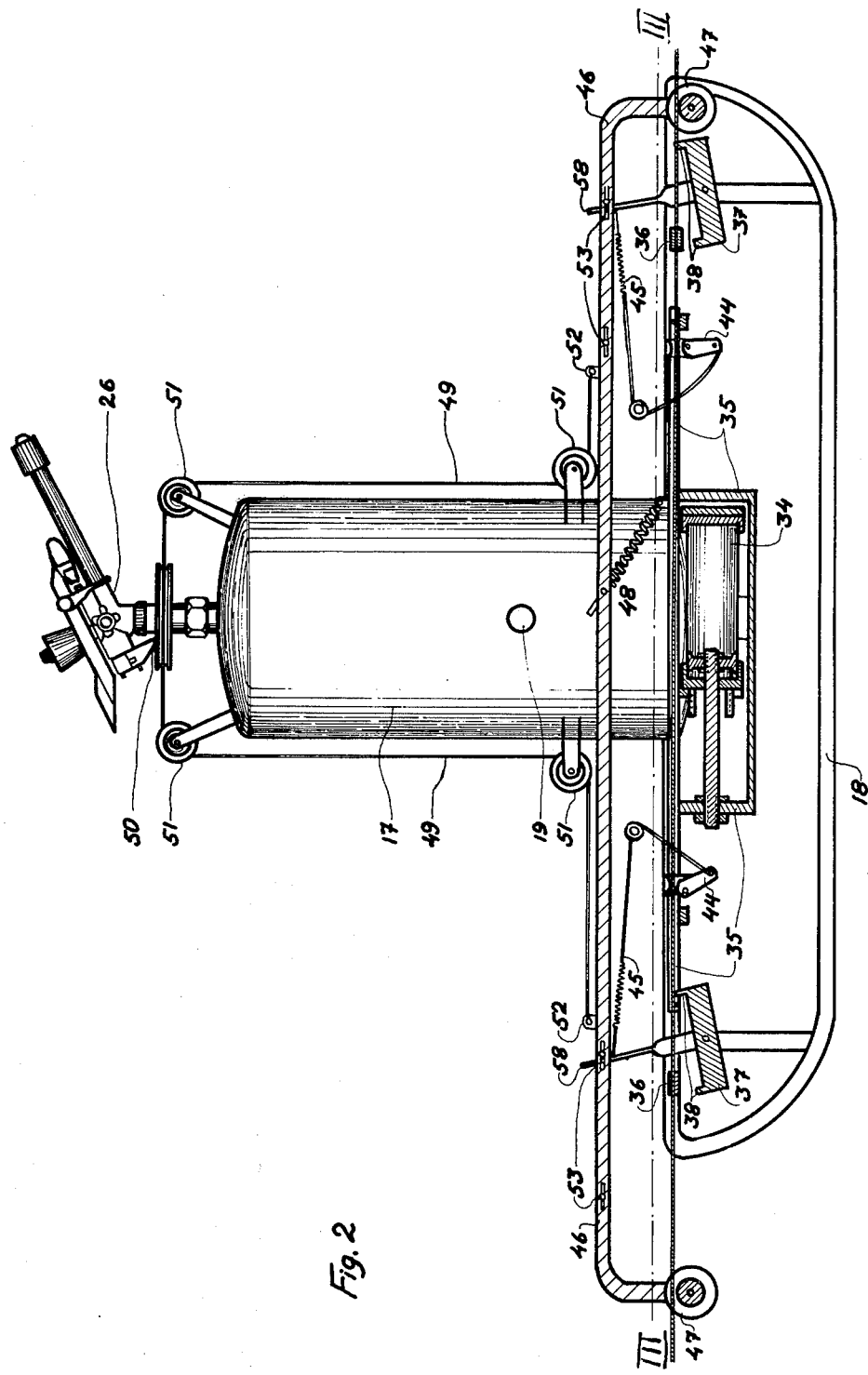
FIG. 2 is a partially cut away side view of a watering apparatus according to the invention carried on runners.

The apparatus illustrated in FIG. 2 comprises a pressure vessel 17 which rests on a frame comprising two runners 18. The pressure vessel is filled with water through a hose 15, which is dragged between the hydrant 16, and an aperture 19 intended for a connection nipple and being associated with the apparatus. Arranged at the bottom of the pressure vessel is a differential piston 21, 24 (see FIG. 4). When the pressure in the pressure vessel has reached a predetermined value, its piston 21 of larger area overcomes the upwardly directed force acting against the piston by a lever 22 acted upon by a spring 23. When the piston 24 of smaller area is immediately thereafter subjected to the same water pressure on both sides, instead of atmospheric pressure previously acting on its upper side, the differential piston rapidly executes a downwardly directed movement.

Water will then flow into the pipe 25 at a greater speed, said pipe opening into the spray device 26. The water is thus delivered from the spray device at a great force in the form of a pulsating jet.

When the pressure has again fallen in the pressure vessel, the differential piston returns to its upper limit position, in which the upper part of the piston 24 serves as a valve and shuts off the flow of water through the pipe 25, whereupon the pressure in the pressure vessel again increases.

Each time the differential piston 21, 24 changes its direction of movement the lever 22 is actuated, and thereby an arm 26 on a valve 27. The valve 27 receives water from the pressure vessel at 28 and distributes the water via either a channel 29, 30 or a channel 31, these channels being connected at each end of a double-acting hydraulic piston 34 (FIG. 2). Water from that part of the hydraulic piston which is not under pressure is conducted away through a channel 32, drainage being effected via a pipe 33.

The hydraulic piston 34 is thus caused to move reciprocatingly. It entrains therewith a rod 35 having on each end thereof a wire gripping device 36 (FIG. 3) which in its working position (left side) is securely locked to the wire each time it moves in a direction towards the pressure vessel. In the opposite direction of movement it only slides on the wire.

The gripping device can be caused to adopt an active and an inactive position, respectively. This is effected by means of two rocker arms 37 each of which is provided with two projections 38 arranged to actuate the element 39 and 40 pivotable about pins 41 and 42, respectively. The two arms 43 function as springs which attempt to bias the pins 42 in a direction towards the pin 41. When the pin 41 passes a straight line between the pins 42, the elements 40 and 39 take an active and an inactive position, respectively.

The wire is held taut between each working cycle by means of an auxiliary gripping device 44. Springs 45 are arranged to be tensioned and relaxed, respectively, in a manner such as to bring the gripping device 44 to an active and an inactive position, respectively. This takes place in the limit positions of the watering apparatus with the aid of a reversing rod 46. When the machine arrives at an end post 14, the end post actuates the reversing rod 46 either directly or indirectly, e.g. via a wire lock, by means of pressure on a pulley 47, so that the reversing rod is urged rearwardly.

A spring 48 contributes to the reversing rod 46 taking a limit position upon its movement backwards and forwards subsequent to passage of a critical point. Upon each reversal, the sector spray device 26 is rotated through 180° with the aid of a wire 49 which is wound a number of turns around a pulley 50 and is attached to the reversing rod via idling pulleys 51 and 52.

At the final phase of its movement, the reversing rod actuates the rocker arms 37, via adjustable screws 53, through arms 58. The reversable rod causes the spring 45 to take a tensioned or relaxed position, respectively, which together with movement of the rocker arms 37 causes the machine to move in one direction or the other.

To summarize the operational movement of the watering apparatus along the wire 13 the apparatus as shown in FIG. 2 has just completed an advancing step to the left since the piston 34 is illustrated at almost its extreme right-hand position within the cylinder. As indicated previously, the piston 34, the rod 35, the two wire gripping devices 36 and the auxiliary gripping devices 44 are all connected together for simultaneous movement. The left-hand wire gripping device 36 as viewed in FIGS. 2 and 3 is in its locked or wire gripping condition. The wire gripping device 35 is essentially a one-way gripping mechanism so that upon the application of pressure at the right-hand end of the piston 34, the piston 34 will move to the left thereby shifting the rod 35 and all of the wire gripping devices to the left with the left-hand wire gripping device 36 and the left-hand auxiliary gripping device 44 sliding along the wire. Due to the weight of the frame 18 with the pressure vessel thereon, the frame will remain stationary in the field. When the piston 34 reaches its extreme limit of movement at the left-hand end of the cylinder, the pressurized fluid will then be applied into the cylinder at the left end of the piston 34. Since the piston will remain stationary due to the gripping of the wire by the left-hand wire gripping device 36, the cylinder and the frame 18 which are secured together will move to the left. The right-hand wire gripping device 36 is in the unlocked condition as viewed in FIG. 3 and since the tension on the spring 45 is relieved the right-hand auxiliary wire gripping device 44 will not be in gripping engagement with the wire 13.

When the watering apparatus reaches the stake 14, the stake 14 or any other suitable abutment will cause the reversing rod 46 as viewed in FIG. 2 to move to the right. In addition to rotating the sector spray device 26 through 180° the movement of the reversing rod 46 will pivot the arms 58 to the right as viewed in FIG. 2. This will bring the left-hand projection on each rocker arm 37 upwardly into the path of movement of the end of each element 39 remote from the pin 41. Therefore, upon movement of the rod 35 in conjunction with the piston 34 to the right the projections 38 will engage the ends of the elements 49 and cause them to pivot about the pivot pins 41 and 42 to bring the left-hand wire gripping device 36 into the condition of the right-hand wire gripping device as seen in FIG. 3. Likewise, the right-hand wire gripping device will be shifted into the condition of the left-hand wire gripping device as viewed in FIG. 3 so that continued reciprocation of the piston 34 relative to the cylinder will cause the frame 18 to move to the right as viewed in FIGS. 2 and 3. This movement will continue until the stake 14 at the opposite end of the wire 13 engages the reversing rod 46.

The invention can be modified in many ways within the scope of its basic concept as defined in the accompanying claims. Thus, the watering apparatus may be suspended from the wire along which it moves. Further, the mechanical element by which movement of the drive hydraulics is transmitted may be designed different ways than that illustrated without departing from the concept of the invention.

What I claim is:

1. A method of watering while using a watering apparatus comprising a pressure vessel and a spray device and to which water is supplied through a hose, comprising the steps of discharging intermittently from the pressure vessel the water supplied thereto, and intermittently moving the watering apparatus along a given path during the recharging of the pressure vessel by utilising the energy stored in the water.

2. A method according to claim 1, wherein the number of drive pulses per unit of time applied to a drive means associated with the watering apparatus is equal to the number of pulses delivered per unit of time from the pressure vessel.

3. A method according to claim 1 further comprising causing the watering apparatus to move reciprocatingly along a path having two ends and switching the direction of drive at the ends of the path.

4. A method according to claim 3, further comprising changing the direction of the spray device about 180° upon a change in the drive direction.

5. A method according to claim 1, further comprising moving the watering apparatus along a wire disposed parallel to said path and supplying water to the watering apparatus, via said hose, from a hydrant located in the neighborhood of the center of said path.